United States Patent [19]

Sugita et al.

[11] Patent Number: 4,687,712
[45] Date of Patent: Aug. 18, 1987

[54] VERTICAL MAGNETIC RECORDING MEDIUM

[75] Inventors: Ryuji Sugita, Hirakata; Kazuyoshi Honda, Takatsuki; Hiroshi Nishida, Takaishi; Kyoji Noda, Kumamoto, all of Japan

[73] Assignee: Matsushita Electric Industrial Co., Ltd., Osaka, Japan

[21] Appl. No.: 678,040

[22] Filed: Dec. 4, 1984

[30] Foreign Application Priority Data

Dec. 12, 1983 [JP] Japan ................................ 58-233841
Dec. 27, 1983 [JP] Japan ................................ 58-251093

[51] Int. Cl.$^4$ ............................................. G11B 5/66
[52] U.S. Cl. ................................. 428/611; 428/635; 428/660; 428/668; 428/678; 428/679; 428/928
[58] Field of Search ............... 428/928, 611, 668, 666, 428/660, 624, 625, 626, 635, 632, 678; 360/134, 135, 131

[56] References Cited

U.S. PATENT DOCUMENTS

| | | | |
|---|---|---|---|
| 3,350,180 | 10/1967 | Croll | 428/928 |
| 3,479,156 | 11/1969 | Ginder | 428/928 |
| 3,787,237 | 1/1974 | Grunberg et al. | 428/928 |
| 4,103,315 | 7/1978 | Hempstead et al. | 428/928 |
| 4,550,062 | 10/1985 | Takayama et al. | 428/928 |
| 4,621,030 | 11/1986 | Vesaka et al. | 428/928 |

FOREIGN PATENT DOCUMENTS

| | | | |
|---|---|---|---|
| 37721 | 3/1982 | Japan | 428/611 |
| 114329 | 7/1983 | Japan | 360/131 |
| 33630 | 2/1984 | Japan | 360/131 |
| 29927 | 2/1985 | Japan | 360/131 |

OTHER PUBLICATIONS

Kazuo Kabayashi et al., "High Density Perpendicular Magnetic Recording on Rigid Disks", Fujitsu Sci. Tech. J. 19, 1, pp. 99–126, Mar. 1983.
Lodder et al., "R.F.-Sputtered Co-Cr Layers for Perpendicular Magnetic Recording", *Thin Solid Films,* 101, (1983), 61–73.

Primary Examiner—L. Dewayne Rutledge
Assistant Examiner—John J. Zimmerman
Attorney, Agent, or Firm—Stevens, Davis, Miller & Mosher

[57] ABSTRACT

A vertical magnetic recording medium comprises a non-magnetic substrate, a permalloy film consisting of plural permalloy layers separated by at least one non-magnetic layer placed therein, each of said plurality of permalloy layers being 2000 Å or less thick, and a Co-Cr vertical magnetization film formed on the permalloy film directly or through another non-magnetic layer.

32 Claims, 12 Drawing Figures

VERTICAL MAGNETIC RECORDING MEDIUM

This invention relates to a vertical magnetic recording medium having an excellent short wavelength recording and reproducing characteristic.

As one example of the magnetic recording system having an excellent short wavelength recording system, there has been heretofor a vertical magnetic recording system. This system requires a vertical magnetic recording medium having an easy magnetization axis substantially vertical to the film surface of the medium. The residual magnetization after signals have been recorded on such a medium is located in the direction substantially vertical to the film surface of the medium so that the shorter wavelength of the signal provides a lower demagnetizing field within the medium to produce an excellent reproduction output. A Co-Cr vertical magnetic recording medium called a single layer film medium is the vertical magnetization film having a Co-Cr alloy as a main component, formed on a non-magnetic substrate by sputtering or vacuum evaporation technique including such a method as evaporated atoms are partially ionized and deposited, like ion plating. For improvements of recording efficiency and reproduction output, a so-called double film medium has been proposed which incorporates a permalloy 3 sandwiched between a non-magnetic substrate 1 and a Co-Cr vertical magnetization film 2, as shown in FIG. 1. Particularly, the recording and reproduction using a known auxiliary magnetic pole excitation type vertical head on such a double layer film medium improves recording efficiency and reproduction output each about 20 dB.

As described above, the employment of the double layer medium gives an excellent recording and reproducing characteristic. However, further improvement is required in view of the continued movement toward higher density recording and compactness of the magnetic recording and reproducing device, and so a better characteristic is required for this purpose.

An object of this invention is to provide a vertical magnetic recording medium having an excellent reproduction characteristic.

This invention will be apparent from the following description taken in conjunction with the accompanying drawings, in which.

In all figures like reference numerals refer to like elements.

Figure 1:
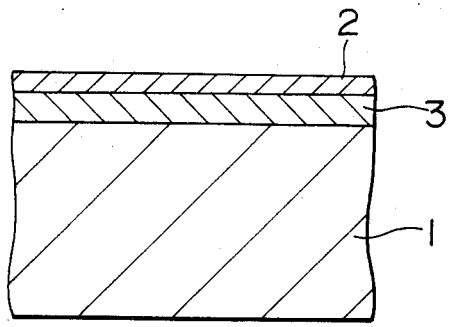
FIG. 1 is a sectional view showing the construction of the conventional double layer film medium.
Figure 2:
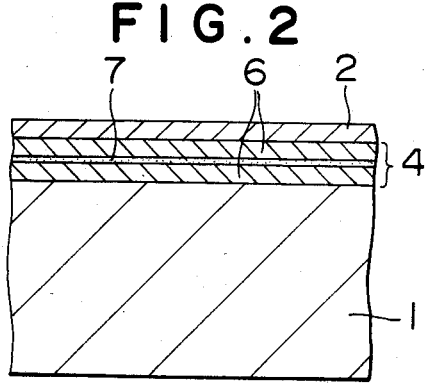
FIGS. 2 and 3 are sectional views each showing an embodiment of the double layer film medium according to this invention, respectively.
Figure 3:
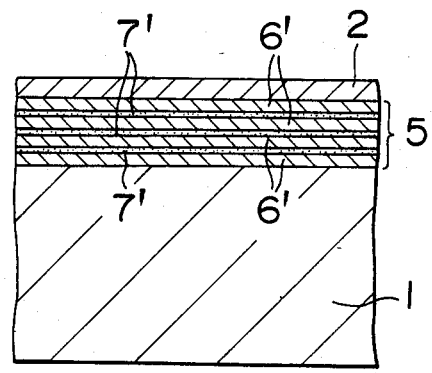

Explanation will first be made on the embodiments of this invention referring to FIGS. 2-12. The conventional double layer film medium is formed by a single layer structure of a permalloy film 3 as shown in FIG. 1, while the double layer film medium according to this invention, i.e. each of permalloy films 4 and 5 is formed by a multilayer structure such as shown in FIGS. 2 and 3. More specifically, the permalloy film 4 of FIG. 2 is of a double layer structure having two permalloy layers 6 separated by a non-magnetic layer 7 placed therein. The permalloy film 5 of FIG. 3 is of a quadruple structure having four permalloy layers 6' respectively separated by non-magnetic layer 7' placed therein.

Figure 4:
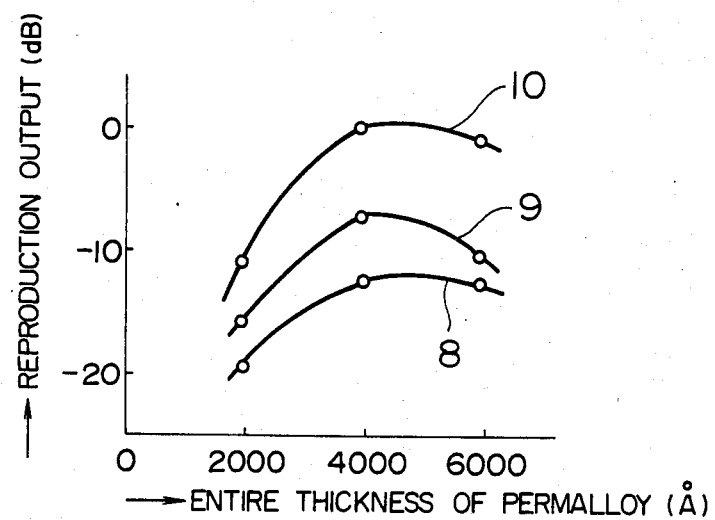
FIG. 4 is a graph showing an entire film thickness of a permalloy film vs. reproduction output characteristic.

It has been confirmed that the thus formed double layer film medium having a permalloy of a multilayer structure, as a result of measurement of the recording and reproducing characteristic thereof, provides an increased reproduction output as compared with the double layer film medium having a permalloy of a single layer structure. This will be explained hereinbelow. FIG. 4 illustrates a reproduction output as a function of the entire film thickness of the permalloy using the structure thereof as a parameter. It is assumed that the thickness of the Co-Cr vertical magnetization film is fixed to 1500 Å and the non-magnetic film(s) within the permalloy film is made of a Ti film of 100 Å, and assumed that the recording and reproducing of signals are carried out by using an auxiliary magnetic pole excitation type vertical head with a recording density of 50 KFRPI. 50 KFRPI represents a recording state of digital signals, with 5000 times magnetization inversions for one inch. Curves 8, 9, and 10 in FIG. 4 illustrate the relation between the entire film thickness of the permalloy and the reproduction output in the case where the double layer film medium is of a permalloy film of a single layer structure, double layer structure or quadruple layer structure, respectively. As understood from the figure, where the entire thickness of the permalloy is fixed, the more the number of the layers of the permalloy film of a multistructure, the higher is the reproduction output. This is guessed to be attributable to the magnitude of the initial permeability of the permalloy film. The concrete causes therefor may be the following two points. First, the initial permeability of the film will increase with the reduction of the thickness for one layer, with the film being of a multistructure. Secondly, when the permalloy film is of a single layer structure, the initial permeability of the entire permalloy film will decrease because of the magnetostatic interaction between the Co-Cr film and the permalloy film. On the other hand, when the permalloy film is of a multilayer structure as in this invention, the initial permeability of only the permalloy layer most adjacent to the Co-Cr film will decrease while that of any permalloy layer other than the above permalloy layer will not decrease. It is considered that these facts may constitute main causes of the increase of the reproduction output of the vertical magnetic recording medium according to this invention. Thus, this invention particularly considers the fact that the magnetic characteristic of the permalloy film varies due to the magnetostatic interaction with the Co-Cr film, which has not ever been considered in the conventional vertical magnetic recording medium. The meritorious effects of this invention was first confirmed through experiments conducted by the inventors of this invention.

Figure 5:
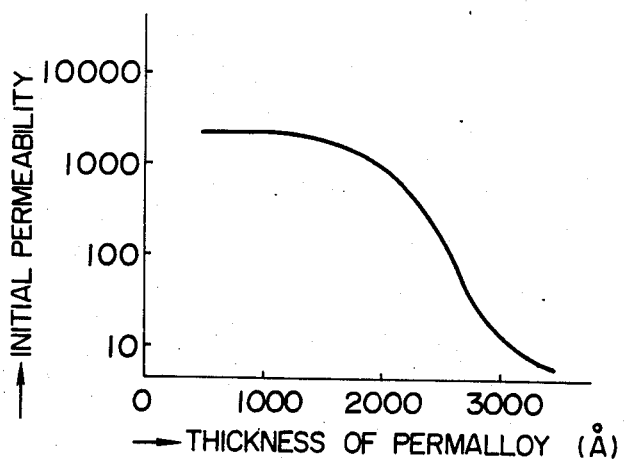
FIG. 5 is a graph showing an entire film thickness of the permalloy film vs. initial permeability characteristic.

FIG. 5 shows the relation between the thickness and the initial permeability in the case where a permalloy film is formed on a substrate of heat resistive high polymer by vacuum evaporation. The permalloy film of the double layer film medium acts as a portion of a head at the times of recording and reproducing. Therefore, the initial permeability of the permalloy must be at least 1000. As seen from FIG. 5, in order to obtain the permalloy film having an initial permeability of 1000 or more, the film thickness thereof must be 2000 Å or less, although in the neighborhood of 2000 Å, the initial permeability varies with the film thickness and so lacks in stability. With the film thickness of the permalloy film being 1200 Å or less, the initial permeability is fixed to about 2500 and stabilized. It has been confirmed through the experiments by the inventors that such a permalloy film does not vary in its initial permeability even with plural layers stacked, by locating a non-magnetic layer(s) of 10 Å or more therebetween. Therefore, in view of the initial permeability, the thickness of each of the permalloy layers (6 in FIGS. 2 and 6' in FIG. 3) must be 2000 Å and may be preferably 1200 Å or less considering stability.

As described above, when plural permalloy layers are stacked, the thickness of any non-magnetic layer therebetween must be 10 Å or more, since the magnetic layer of 10 Å or less gives an abrupt increase of the interaction between the permalloy layers, thereby to reduce the initial permeability of the entire permalloy film. Further, when the thickness of the non-magnetic layer exceeds 500 Å, the recording and reproducing characteristic in the mode of double layer film medium will abruptly deteriorate. The reason therefor is not still clear but may possibly be ascribed to the loss in space between the head and the medium.

The non-magnetic layer 7,7' in the permalloy film may be made of any one of Al, Si, Cu, Ti, $Al_2O_3$, $SiO_2$, etc., but it has been experimentally confirmed by the inventors that Ti is most suitable. More specifically, in the case of the double layer film medium, the c-axis of the hexagonal close packed structure in the Co-Cr vertical magnetic film must be oriented in the direction vertical to the film surface, and the non-magnetic layer of Ti provides the most excellent orientation.

As mentioned above, the multilayer structure of the permalloy film in the mode of double layer film medium provides a higher reproduction output than the conventional double layer film medium. However, further experiments have revealed that the mere multilayer structure of the permalloy film may increase noise depending on the head or measurement requirements. Explanation will be made on the details of this and the countermeasure therefor.

There will be explained the reproduction output and noise when the thickness of each layer in the permalloy film is varied in the mode of double layer film medium having the double layer structure of permalloy film. With the film thickness of the Co-Cr vertical magnetization film in the double layer film medium and the total thickness of the permalloy film being fixed to 2000 Å and 3000 Å, respectively, the reproduction output and noise level as regards each of the following double layer film medium samples P, A, B and C have been measured. In the following table, an upper layer represents the permalloy layer in contact with the Co-Cr film in FIG. 2 while a lower layer represents the permalloy layer in contact with the substrate in FIG. 2.

TABLE

| Sample | Permalloy Film Structure |
|---|---|
| P | Single layer structure (conventional structure) |
| A | Double layer structure with both upper and lower layers being of the same thickness of 1500 Å |
| B | Double layer structure with the upper layer and lower layer being of a thickness of 1000 Å and 2000 Å, respectively. |
| C | Double layer structure with the upper layer and lower layer being of a thickness of 2000 Å and 1000 Å, respectively. |

Figure 6:
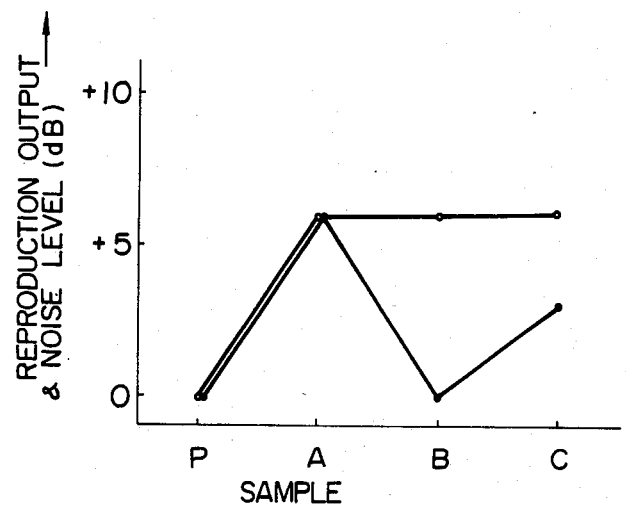
FIG. 6 is a graph showing reproduction characteristics of several kinds of double layer film medium.

FIG. 6 shows an example of the reproduction output and noise level in each of the above double layer film mediums. In FIG. 6, ○ marks and ● marks represent the reproduction output and noise level, respectively, with reference to those of the conventional double layer film medium (sample P). The recording and reproducing have been carried out by using the known auxiliary magnetic pole excitation type vertical head, with the recording density fixed to 50 KFRPI. The main magnetic pole in the above head is composed of a Co-Zr system amorphous thin film 3000 Å thick sandwiched by ceramics, and has a tip shape of the ball having a radius of 2 mm. Measurement has been made by causing this main magnetic pole to be contacted with the medium by a pressing force of about 10 g. A polyimide film 40 μm thick has been used as a substrate of the medium.

As seen from FIG. 6, all the samples A, B and C have a reproduction output of +6 dB with reference to the sample P. As for the noise level, the sample B is substantially the same as the sample P, but the samples A, C are +6 dB and +6 dB with reference to the sample P, respectively. Thus, the samples A, B and C have an S/N (signal-to-noise ratio) of 0 dB, +6 dB and +3 dB with reference to the sample P and so the sample B is the most excellent.

Accordingly, it is understood that the double layer film medium having the different thickness of each of the upper and lower layers of the double layer structure of the permalloy provides a reproduction output with a more excellent S/N than the double layer film medium having the same thickness thereof. Further, it is also understood that the permalloy layer most adjacent to the Co-Cr vertical magnetization film 2 is made thinner in its thickness than that most adjacent to the non-magnetic substrate 1 as in the sample B so that the reproduction output with a better S/N than the case of a structure opposite to the above structure can be obtained. This conclusion also applies for the case of a triple or more layer structure of the permalloy film 2 as well as the double layer structure thereof, which has been experimentally confirmed by the inventors. With the main magnetic pole having a tip shape of the ball having a radius of 60 mm, and contacted to the medium by a pressing force of about 10 g, the same measurement as above provides the same reproduction output as and the different noise level from the above case. More specifically, in the case of the main magnetic pole having a tip shape of the ball having a radius of 2 mm, the samples A and C have a noise level of +6 dB and +3 dB with reference to the sample P, respectively. On the other hand, in the case of the main magnetic pole having a tip shape of the ball having a radius of 60 mm, the samples A, B, C and P provide substantially the same noise level. Namely, in the latter case, the S/N of the reproduction output is not influenced by the relation among the respective thicknesses of the layers of the permalloy, while in the former case it is greatly influenced thereby, and the structure of the sample B provides a reproduction output having the best S/N as mentioned above. The reason for such phenomenon is not still clear, but is considered to be attributed to the magnetostriction constant, magnetic anisotropy constant, magnetic domain structure, etc. of the permalloy film.

Figure 7:
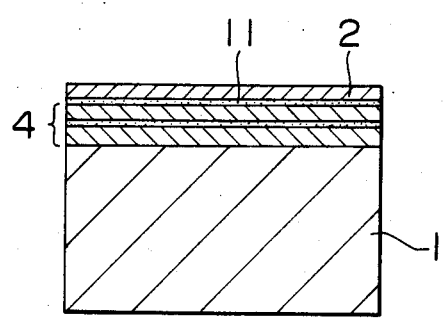
FIG. 7 is a sectional view showing the double layer film medium according to another embodiment of this invention.

In the above embodiment, the explanation has been made on the double layer film medium in which the Co-Cr vertical magnetic film is directly formed on the permalloy film. However, placing a non-magnetic layer 11 between both films as shown in FIG. 7 also provides the same result as the above embodiment, provided that the thickness of the non-magnetic layer 11 is about 500 Å or less. Incidentally, replacing this non-magnetic layer 11 by Ti or amorphous layer provides a meritorious effect of greatly improving the vertical orientation of c-axis of the Co-Cr vertical magnetization film 2.

Hereinafter, more concrete embodiments will be explained.

CONCRETE EMBODIMENT 1

Figure 8:
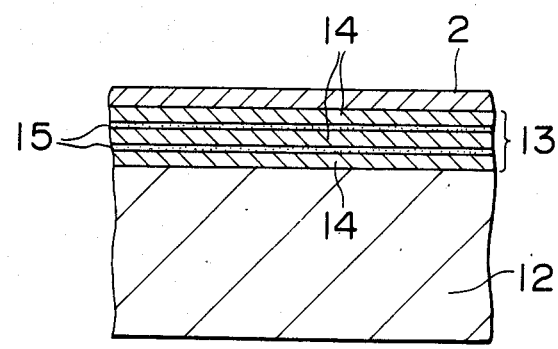
FIGS. 8-12 are sectional views each showing the double layer film medium according additional more concrete embodiments of this invention, respectively.

A first concrete embodiment of this invention will be explained referring to FIG. 8. In the figure, numeral 12 designates a film substrate 50 μm thick made of heat resistive high polymer; 2 a Co-Cr vertical magnetization film 2000 Å thick; 13 a permalloy film of a triple layer structure in which three permalloy layers 14 each 1200 Å thick are stacked through Ti films 15. When signals are recorded with a recording density of 100 KFRPI and reproduced on the above structure of double layer film medium by using an auxiliary magnetic pole excitation type vertical head, there can be obtained the reproduction output higher to the extent of 30 dB than the conventional Co-containing iron-oxide particulate type medium. There can be also obtained the reproduction output higher to the extent of 9 dB than the double layer film medium having the same structure as FIG. 8 except that the permalloy film is of a single layer structure and 3600 Å thick.

CONCRETE EMBODIMENT 2

Figure 9:
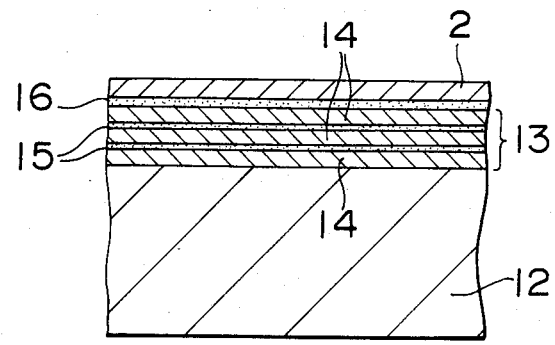

A second concrete embodiment of this invention will be explained referring to FIG. 9, which shows the same structure as that of FIG. 8 except the existence of a Ti film 300 Å thick placed between the permalloy film 13 and the Co-Cr vertical magnetization film 2. The Ti film 16 improves the orientation of the Co-Cr vertical magnetization film. When signals are recorded on such a structure of a double layer film medium and reproduced therefrom in the same manner as the first concrete embodiment, there can be obtained the reproduction output higher to the extent of 32 dB than the conventional Co-containing iron-oxide particulate type medium.

CONCRETE EMBODIMENT 3

Figure 10:
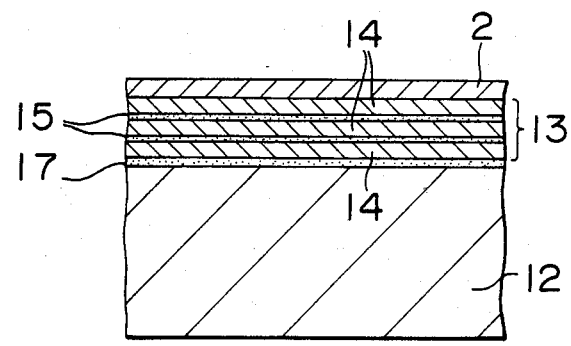

A third concrete embodiment of this invention will be explained referring to FIG. 10, which shows the same structure as that of FIG. 8 except the existence of a Ti film 17 300 Å thick placed between the permalloy film 13 and the film substrate 12 of heat resistive high polymer. The Ti film 17 improves the orientation of the Co-Cr vertical magnetization film 2 as in the second concrete embodiment. When signals are recorded on such a structure of double layer film medium and reproduced therefrom in the same manner as the first and second concrete embodiments, there can be obtained the reproduction output higher to the extent of 34 dB than the conventional Co-containing iron-oxide particulate type medium.

CONCRETE EMBODIMENT 4

Figure 11:
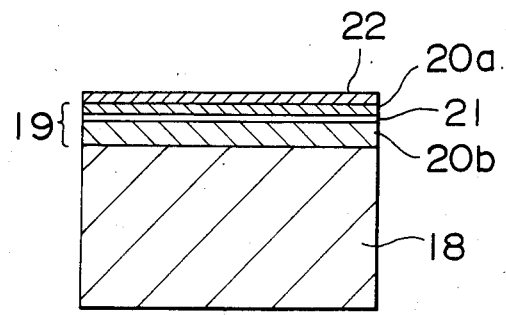

A fourth embodiment will be explained referring to FIG. 11. In the figure, numeral 18 denotes a polyethylene terephthalate film 50 μm thick; 19 denotes a permalloy film of a double layer structure which is composed of an upper layer 20a 1000 Å thick, a lower layer 20b 2000 Å thick and a Ti film 21 150 Å thick placed therebetween; and 22 denotes a Co-Cr vertical magnetization film 1800 Å thick. When signals are recorded on such a structure of a double layer film medium and reproduced therefrom in the same manner as in the preceding concrete embodiments, there can be obtained a S/N higher to the extent of 28 dB than the conventional Co-containing iron-oxide particulate type medium. There can be also obtained a S/N higher to the extent of +7 dB than the double layer film having the same structure as that of FIG. 11 except that the permalloy film is of a single layer structure and a thickness of 3000 Å.

CONCRETE EMBODIMENT 5

Figure 12:
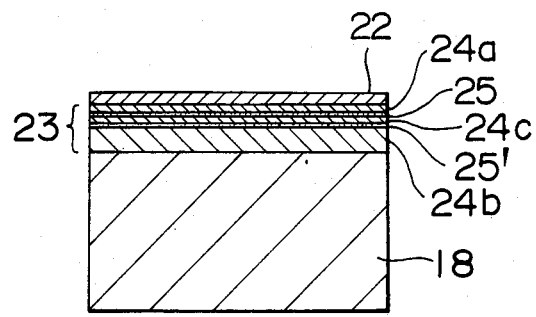

A fifth concrete embodiment will be explained referring to FIG. 12. In the figure, numerals 18, 22 refer to the same elements as in the fourth concrete embodiment. Numeral 23 denotes a triple layer structure of permalloy film, which is composed of an upper layer 24a 600 Å thick, intermediate layer 24c 600 Å thick, Ti film 25 150 Å thick placed therebetween, lower layer 24b 2000 Å thick and Ti film 25' 150 Å thick placed between the intermediate layer 24c and the lower layer 24b. The recording and reproduction in the same manner as in the preceding concrete embodiments provides S/N higher to the extent of 31 dB than the conventional Co-containing iron-oxide particulate type medium.

We claim:

1. A vertical magnetization recording medium comprising a non-magnetic substrate, a permalloy film formed on the non-magnetic substrate said permalloy film consisting of a plurality of permalloy layers separated by at least one first non-magnetic layer placed therein, each of said plurality of permalloy layers being 2000 Å or less thick, and a vertical magnetization film formed on the permalloy film by one of: direct formation on the permalloy film, and formation on the permalloy film through a second non-magnetic layer.

2. A vertical magnetization recording medium according to claim 1, wherein said first non-magnetic layer ranges from 10 Å to 500 Å in thickness.

3. A vertical magnetization recording medium according to claim 1, wherein said first non-magnetic layer is made of Ti.

4. A vertical magnetization recording medium according to claim 3, wherein said first magnetic layer ranges from 10 Å to 500 Å in thickness.

5. A vertical magnetization recording medium according to claim 1, wherein at least one pair of layers among said plurality of permalloy layers have a different thickness from each other.

6. A vertical magnetic recording medium according to claim 5, wherein said first non-magnetic layer is made of Ti.

7. A vertical magnetic recording medium according to claim 5, wherein said at least one pair of layers are an upper layer most adjacent to the vertical magnetization film and a lower layer most adjacent to the non-magnetic substrate, and the upper layer is thinner than the lower layer.

8. A vertical magnetic recording medium according to claim 7, wherein said first non-magnetic layer is made of Ti.

9. A vertical magnetization recording medium comprising a non-magnetic substrate, a permalloy film formed on the non-magnetic substrate said permalloy film consisting of a plurality of permalloy layers separated by at least one first non-magnetic layer placed therein, each of said plurality of permalloy layers being 2000 Å or less thick, and a Co-Cr vertical magnetization film formed on the permalloy film by one of: direct formation on the permalloy film, and formation on the permalloy film through a second non-magnetic layer.

10. A vertical magnetization recording medium according to claim 9, wherein said first non-magnetic layer ranges from 10 Å to 500 Å in thickness.

11. A vertical magnetization recording medium according to claim 9, wherein said first non-magnetic layer is made of Ti.

12. A vertical magnetization recording medium according to claim 11, wherein said first non-magnetic layer ranges from 10 Å to 500 Å in thickness.

13. A vertical magnetization recording medium according to claim 9, wherein at least one pair of layers among said plurality of permalloy layers have a different thickness from each other.

14. A vertical magnetic recording medium according to claim 13, wherein said first non-agnetic layer is made of Ti.

15. A vertical magnetic recording medium according to claim 13, wherein said at least one pair of layers are an upper layer most adjacent to the Co-Cr vertical magnetization film and a lower layer most adjacent to the non-magnetic substrate, and the upper layer is thinner than the lower layer.

16. A vertical magnetic recording medium according to claim 15, wherein said first non-magnetic layer is made of Ti.

17. A vertical magnetization recording medium comprising a non-magnetic substrate, a permalloy film formed on the non-magnetic substrate said permalloy film consisting of a plurality of permalloy layers separated by at least one first non-magnetic layer placed therin, each of said plurality of permalloy layers being 1200 Å or less, and a vertical magnetization film formed on the permalloy film by one of: direct formation on the permalloy film, and formation on the permalloy film through a second non-magnetic layer.

18. A vertical magnetization recording medium according to claim 17, wherein said first non-magnetic layer ranges 10 Å to 500 Å in thickness.

19. A vertical magnetization recording medium according to claim 17, wherein said first non-magnetic layer is made of Ti.

20. A vertical magnetization recording medium according to claim 19, wherein said first non-magnetic layer ranges from 10 Å to 500 Å in thickness.

21. A vertical magnetization recording medium according to claim 17, wherein at least one pair of layers among said plurality of permalloy layers have a different thickness from each other.

22. A vertical magnetic recording medium according to claim 21, wherein said first nonnagnetic layer is made of Ti.

23. A vertical magnetic recording medium according to claim 21, wherein said at least one pair of layers are an upper layer most adjacent to the vertical magnetization film and a lower layer most adjacent to the non-magnetic substrate, and the upper layer is thinner than the lower layer.

24. A vertical magnetic recording medium according to claim 23, wherein said first non-magnetic layer is made of Ti.

25. A vertical magnetization recording medium comprising a non-magnetic substrate, a permalloy film formed on the non-magnetic substrate said permalloy film consisting of a plurality of permalloy layers separated by at least one first non-magnetic layer placed therein, each of said plurality of permalloy layers being 1200 Å or less thick, and a Co-Cr vertical magnetization film formed on the permalloy film by one of: direct formation on the permalloy film, and formation on the permalloy film through a second non-magnetic layer.

26. A vertical magnetization recording medium according to claim 25, wherein said first non-magnetic 27. A vertical magnetization recording medium according to claim 25, wherein said first non-magnetic layer is made of Ti.

28. A vertical magnetization recording medium according to claim 27, wherein said first non-magnetic layer ranges from 10 Å to 500 Å in thickness.

29. A vertical magnetization recording medium according to claim 25, wherein at least one pair of layers among said plurality of permalloy layers have a different thickness from each other.

30. A vertical magnetic recording medium according to claim 29, wherein said first non-magnetic layer is made of Ti.

31. A vertical magnetic recording medium according to claim 29, wherein said at least one pair of layers are an upper layer most adjacent to the Co-Cr vertical magnetization film and a lower layer most adjacent to the non-magnetic substrate, and the upper layer is thinner than the lower layer.

32. A vertical magnetic recording medium according to claim 31, wherein said first non-magnetic layer is made of Ti.

* * * * *